(12) United States Patent
Fisher, III et al.

(10) Patent No.: US 12,679,253 B2
(45) Date of Patent: Jul. 14, 2026

(54) VEHICLE SEAT ASSEMBLY WITH SWIVEL MECHANISM

(71) Applicant: Fisher & Company, Incorporated, St. Clair Shores, MI (US)

(72) Inventors: Alfred J. Fisher, III, Grosse Pointe Farms, MI (US); Sapan Mahendra Poptani, Northville, MI (US); Matthew McLaughlin, St. Clair Shores, MI (US); Mircea Napau, Sterling Heights, MI (US); Ryan Martin, Macomb, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 348 days.

(21) Appl. No.: 18/318,816

(22) Filed: May 17, 2023

(65) Prior Publication Data

US 2024/0034201 A1 Feb. 1, 2024

Related U.S. Application Data

(60) Provisional application No. 63/392,534, filed on Jul. 27, 2022.

(51) Int. Cl.
*B60N 2/14* (2006.01)
*B60N 2/02* (2006.01)
(Continued)

(52) U.S. Cl.
CPC ........... *B60N 2/14* (2013.01); *B60N 2/02246* (2023.08); *B60N 2/067* (2013.01); *B60N 2/0722* (2013.01); *B60N 2/02253* (2023.08)

(58) Field of Classification Search
CPC . B60N 2/14; B60N 2/06; B60N 2/067; B60N 2/02246; B60N 2/0722; B60N 2/02253; B60N 2002/022
See application file for complete search history.

(56) References Cited

U.S. PATENT DOCUMENTS 4,436,270 A 3/1984 Muraishi
4,792,188 A 12/1988 Kawashima
(Continued)

FOREIGN PATENT DOCUMENTS

CN 210310031 U 4/2020
CN 113370855 A 9/2021
(Continued)

OTHER PUBLICATIONS

Final Office Action regarding U.S. Appl. No. 18/118,820 dated Mar. 21, 2025.

(Continued)

*Primary Examiner* — Philip F Gabler
(74) *Attorney, Agent, or Firm* — Harness, Dickey & Pierce, PLC

(57) ABSTRACT

A seat assembly may include a seatback, a seat bottom, and a pair of seat track assemblies. The seat bottom may be movable in an angular direction relative to the vehicle. The pair of seat track assemblies may include a first seat track assembly and a second seat track assembly. Each of the first and second track assemblies may include a lower track and an upper track slidably engaging the lower track. The upper tracks of the first and second seat track assemblies may be attached to the seat bottom. The upper tracks of the first and second seat track assemblies are independently movable along lengths of the respective lower tracks such that the upper tracks are configured to move along the lengths of the lower tracks at different linear velocities to move the seat bottom and the seatback in the angular direction.

10 Claims, 13 Drawing Sheets

(51) Int. Cl.
    *B60N 2/06*      (2006.01)
    *B60N 2/07*      (2006.01)

(56)          References Cited

U.S. PATENT DOCUMENTS

| | | | |
|---|---|---|---|
| 4,846,529 | A | 7/1989 | Tulley |
| 5,599,065 | A | 2/1997 | Gryp et al. |
| 5,762,398 | A | 6/1998 | Gonzalez et al. |
| 8,182,016 | B2 | 5/2012 | Kaip et al. |
| 9,010,861 | B2 * | 4/2015 | Seibold .................... B60N 2/14 |
| | | | 297/344.21 |
| 9,114,733 | B2 * | 8/2015 | Pluta ........................ B60N 2/14 |
| 9,333,881 | B2 * | 5/2016 | Roth .................. B60N 2/02246 |
| 9,452,692 | B1 * | 9/2016 | Rawlinson ............... B60N 2/14 |
| 9,849,813 | B2 | 12/2017 | Davis et al. |
| 10,259,347 | B2 * | 4/2019 | Kim .................. B60N 2/02246 |
| 10,807,504 | B2 | 10/2020 | Line et al. |
| 10,988,053 | B2 | 4/2021 | Kish et al. |
| 10,988,054 | B1 | 4/2021 | Sturhan et al. |
| 11,001,169 | B2 | 5/2021 | Jang et al. |

| | | | |
|---|---|---|---|
| 2001/0038223 | A1 | 11/2001 | Suga et al. |
| 2014/0138997 | A1 * | 5/2014 | Schulz ................ B60N 2/0244 |
| | | | 297/344.24 |
| 2019/0160976 | A1 | 5/2019 | Feng et al. |
| 2020/0086768 | A1 | 3/2020 | Line et al. |
| 2021/0016375 | A1 * | 1/2021 | Napau .................... B23F 11/00 |

FOREIGN PATENT DOCUMENTS

| | | | | |
|---|---|---|---|---|
| DE | 102009033494 | A1 * | 1/2011 | ............... B60N 2/14 |
| DE | 102012112529 | B3 | 3/2014 | |
| JP | H06-67160 | U | 9/1994 | |
| JP | H10-086713 | A | 4/1998 | |

OTHER PUBLICATIONS

Office Action regarding German Patent Application No. 1120230012806, dated May 21, 2025 [machine translation].

International Search Report regarding Application No. PCT/US2023/014866, mailed Jun. 29, 2023.

\* cited by examiner

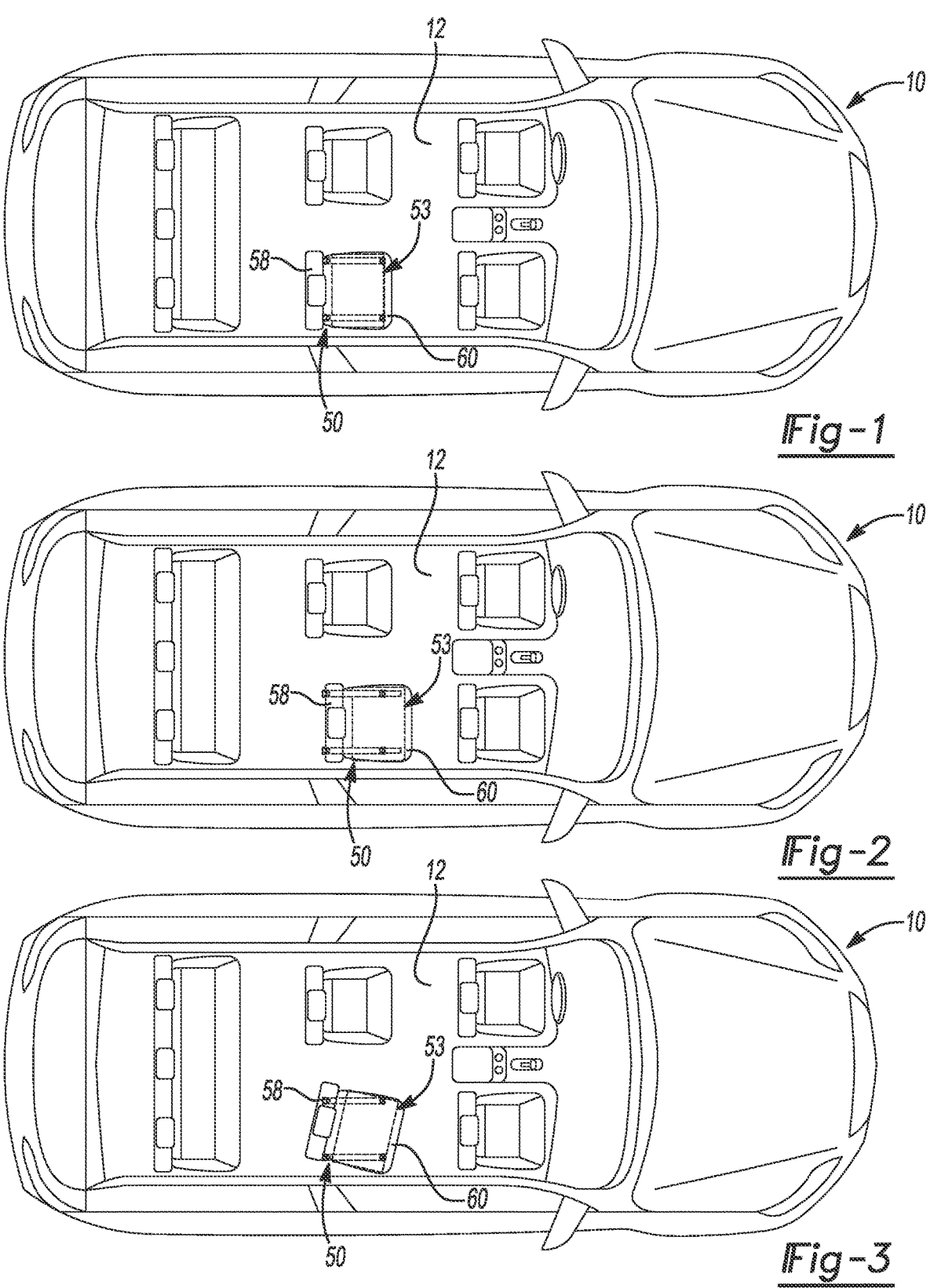
_Fig-1_
_Fig-2_
_Fig-3_

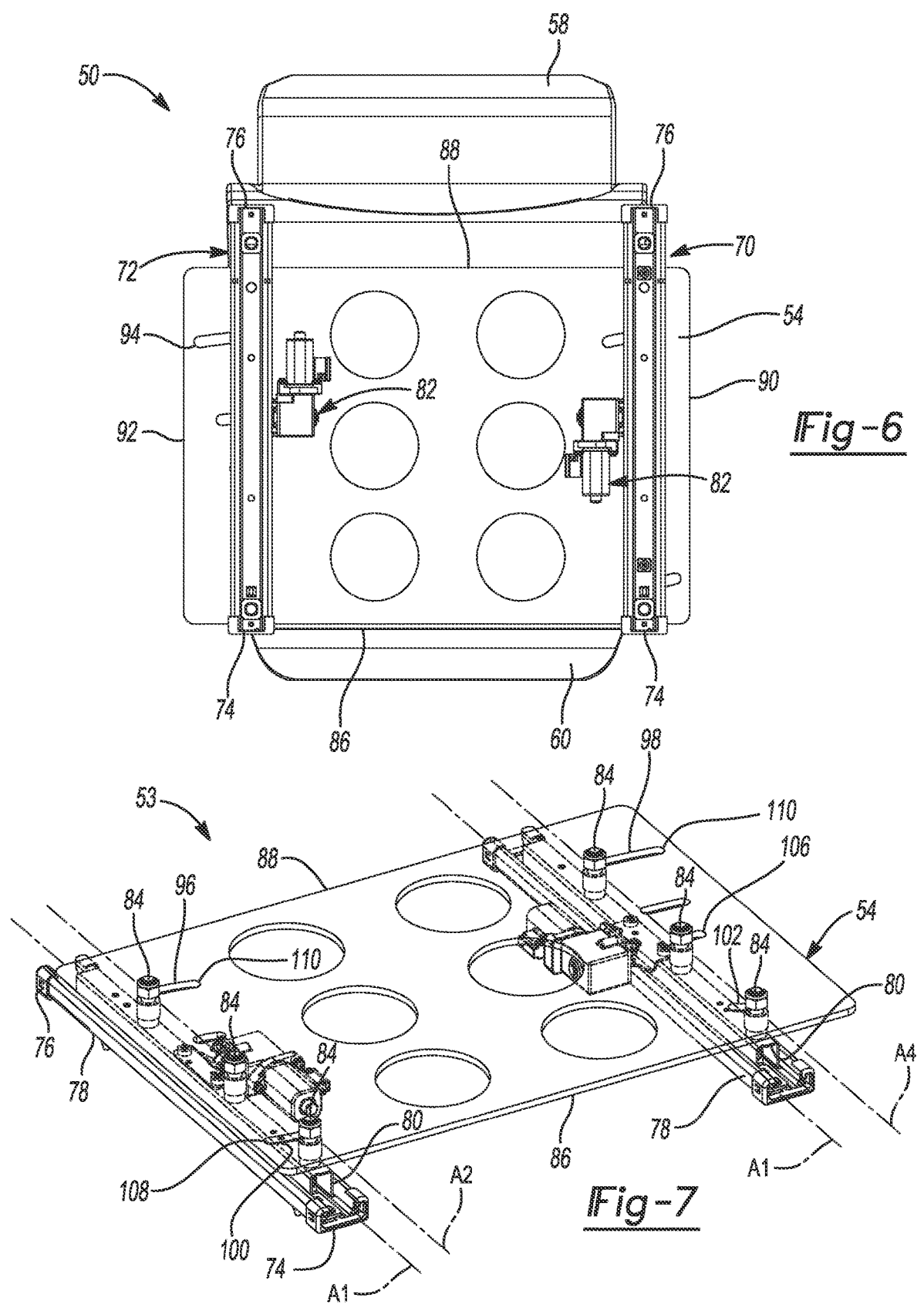
_Fig-6_
_Fig-7_

_Fig-13_
_Fig-14_

VEHICLE SEAT ASSEMBLY WITH SWIVEL MECHANISM

CROSS-REFERENCE TO RELATED APPLICATIONS

This application claims the benefit of U.S. Provisional Application No. 63/392,534, filed on Jul. 27, 2022. The entire disclosure of the above application is incorporated herein by reference.

FIELD

The present disclosure relates to a vehicle seat assembly, and more particularly, to a vehicle seat assembly with a swivel mechanism.

BACKGROUND

This section provides background information related to the present disclosure and is not necessarily prior art.

Vehicles such as automobiles, for example, typically include at least one seat assembly that is movable in one or more directions (e.g., fore-aft, up-down, angular, etc.) relative to a floor of the vehicle. An occupant of the vehicle may adjust the seat's position to suit the occupant's preferences for comfort and/or functionality.

A seat assembly may include a length-adjustment assembly to adjust a position of the seat assembly in a fore-aft direction and may include a swivel assembly to adjust a position of the seat assembly in an angular direction. However, incorporating both a length-adjustment assembly and a swivel assembly in the same seat assembly may be difficult to package, adds complexity and weight to the vehicle, and may be costly to produce. The present disclosure provides a seat assembly including a seat track assembly that is operable to move the seat assembly in both the fore-aft direction and the angular direction in a manner that is minimizes complexity, weight, and cost and fits within a relatively small packaging space.

SUMMARY

This section provides a general summary of the disclosure and is not a comprehensive disclosure of its full scope or all of its features.

The present disclosure provides a vehicle seat assembly that may include a seat and a seat adjustment assembly. The seat may include a seatback and a seat bottom. The seat adjustment assembly may support the seat bottom and may be configured to move the seatback and seat bottom in an angular direction relative to a vehicle floor between a first angular position and a second angular position. The seat adjustment assembly may move the seatback and seat bottom in a fore-aft direction relative to the vehicle floor between a first fore-aft position and a second fore-aft position. The seat adjustment assembly may include a first seat track assembly and a second seat track assembly. Each of the first and second seat track assemblies may include a lower track, an upper track slidably engaging the lower track, and a motor attached to the upper track. The motor may drive the upper track along the lower track in the fore-aft direction. The seat bottom may be mounted to the upper tracks of the first and second seat track assemblies and is movable relative to the upper tracks and the lower tracks in the angular direction when the upper track of the first seat track assembly moves linearly in the fore-aft direction relative to the upper track of the second seat track assembly. The seat is linearly movable relative to the lower tracks in the fore-aft direction when the upper tracks move together at the same linear velocity in the fore-aft direction.

The first seat track assembly and the second seat track assembly may be movable independently and may include the same or different component structures (e.g., the same or different motor, gear ratio, and/or lead screw) from each other. More specifically, the first and second seat track assemblies, using the same or different component structures, may move the seat only in a linear fore-aft direction, only in an angular direction, or simultaneously in linear and angular directions. Movement of the seat in only a linear fore-aft direction occurs when the upper tracks of the first track assembly and second track assembly move at the same linear velocities relative to the lower tracks. Angular movement occurs when the upper tracks of the first track assembly and the second track assembly move at different linear velocities relative to lower tracks. The angular movement may also be achieved when only one of the two track assemblies is moved.

In some configuration of the vehicle seat assembly of the above paragraph, a seat base is attached to the seat bottom and movably coupled to the upper track. The seat base is movable relative to the upper track among a range of positions including a first position and a second position. Movement of the upper track of the first seat track assembly and movement of the upper track of the second seat track assembly at different linear velocities relative to the lower tracks causes rotation of the seat base and the seat between the first and second angular positions.

In some configurations of the vehicle seat assembly of either of the above paragraphs, a support arm includes a first arm end rotatably coupled to the seat base and a second arm end rotatably coupled to the upper track of the second seat track assembly.

In some configurations of the vehicle seat assembly of any of the above paragraphs, the seat base includes an elongated aperture having a first aperture end and a second aperture end.

In some configurations of the vehicle seat assembly of any of the above paragraphs, a protrusion is movably received in the elongated aperture of the seat base and engages the upper track of the first seat track assembly.

In some configurations of the vehicle seat assembly of any of the above paragraphs, the protrusion is a mechanical fastener.

In some configurations of the vehicle seat assembly of any of the above paragraphs, movement of the upper tracks of the first and second seat track assemblies at different linear velocities relative to the lower tracks causes relative movement of the protrusion within the elongated aperture between the first and second aperture ends.

In some configurations of the vehicle seat assembly of any of the above paragraphs, the seat base includes a second elongated aperture having a first end and a second end. The seat adjustment assembly includes a second protrusion movably received in the second elongated aperture of the seat base and engaging the upper track of the second seat track assembly. Movement of the upper track of the first seat track assembly and movement of the upper track of the second seat track assembly at different linear velocities relative to the lower tracks causes relative movement of the second protrusion within the second elongated aperture between the first and second ends of the second elongated aperture.

In some configurations of the vehicle seat assembly of any of the above paragraphs, a spindle screw is attached to the lower track and a length adjuster assembly is attached to the upper track. The length adjuster assembly includes a worm gear threaded about the spindle screw and a cylindrical worm coupled to a drive shaft. The worm gear is meshed with the cylindrical worm.

In some configurations of the vehicle seat assembly of any of the above paragraphs, a gear ratio of the cylindrical worm to the worm gear is less than or equal to 3.25:1.

The present disclosure provides a vehicle seat assembly that may include a seatback, a seat bottom, and a pair of seat track assemblies. The seat bottom is movable relative to the vehicle among a range of positions including a first angular position and a second angular position. The pair of seat track assemblies may include a first seat track assembly and a second seat track assembly. Each of the first and second track assemblies may include a lower track and an upper track slidably engaging the lower track. The upper tracks of the first and second seat track assemblies may be attached to the seat bottom. The upper tracks of the first and second seat track assemblies are independently movable along lengths of the respective lower tracks such that the upper tracks are configured to move along the lengths of the lower tracks at different linear velocities to move the seat bottom and the seatback in an angular direction.

In some configurations of the vehicle seat assembly of the above paragraph, each of the first and second seat track assemblies includes a motor. Each of the motors drives a respective one of the upper tracks along the length of the respective lower track.

In some configurations of the vehicle seat assembly of either of the above paragraphs, the upper tracks of the first and second seat track assemblies are independently movable together along the lengths of the lower tracks at the same linear velocity to move the seat bottom and the seatback in a fore-aft direction without moving the seat bottom and the seatback in the angular direction.

In some configurations of the vehicle seat assembly of any of the above paragraphs, a seat base is attached to the seat bottom and movably coupled to the upper track. The seat base is movable relative to the upper track among a range of positions including a first position and a second position. Movement of the upper track of the first seat track assembly and movement of the upper track of the second seat track assembly at different linear velocities relative to the lower tracks causes rotation of the seat base and the seat between the first and second angular positions.

In some configurations of the vehicle seat assembly of any of the above paragraphs, a support arm includes a first arm end rotatably coupled to the seat base and a second arm end rotatably coupled to the upper track of the second seat track assembly.

In some configurations of the vehicle seat assembly of any of the above paragraphs, the seat base includes an elongated aperture having a first aperture end and a second aperture end.

In some configurations of the vehicle seat assembly of any of the above paragraphs, a protrusion is movably received in the elongated aperture of the seat base and engages the upper track of the first seat track assembly.

In some configurations of the vehicle seat assembly of any of the above paragraphs, the protrusion is a mechanical fastener.

In some configurations of the vehicle seat assembly of any of the above paragraphs, movement of the upper tracks of the first and second seat track assemblies at different linear velocities relative to the lower tracks causes relative movement of the protrusion within the elongated aperture between the first and second aperture ends.

In some configurations of the vehicle seat assembly of any of the above paragraphs, the seat base includes a second elongated aperture having a first end and a second end. The vehicle seat assembly includes a second protrusion movably received in the second elongated aperture of the seat base and engaging the upper track of the second seat track assembly. Movement of the upper track of the first seat track assembly and movement of the upper track of the second seat track assembly at different linear velocities relative to the lower tracks causes relative movement of the second protrusion within the second elongated aperture between the first and second ends of the second elongated aperture.

In some configurations of the vehicle seat assembly of any of the above paragraphs, a spindle screw is attached to the lower track and a length adjuster assembly is attached to the upper track. The length adjuster assembly includes a worm gear threaded about the spindle screw and a cylindrical worm coupled to a drive shaft. The worm gear is meshed with the cylindrical worm.

In some configurations of the vehicle seat assembly of any of the above paragraphs, a gear ratio of the cylindrical worm to the worm gear is less than or equal to 3.25:1.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 1 is a top view of a vehicle with a seat assembly in a first fore-aft position and a first angular position according to the present disclosure;

FIG. 2 is a top view of the vehicle of FIG. 1 with the seat assembly in a second fore-aft position and the first angular position;

FIG. 3 is a top view of the vehicle of FIG. 1 with the seat assembly in a second angular position;

FIG. 6 is a bottom view of the seat assembly of FIG. 4 in the first fore-aft position and the first angular position;

FIG. 7 is a perspective view of the seat adjustment assembly in the first fore-aft position and the first angular position;

FIG. 13 is a partially cross-sectioned perspective view of a motor gear assembly of the seat track assembly of FIG. 9;

FIG. 14 is a perspective view of a drive assembly of the seat track assembly of FIG. 9;

Corresponding reference numerals indicate corresponding parts throughout the several views of the drawings.

DETAILED DESCRIPTION

Figure 4:
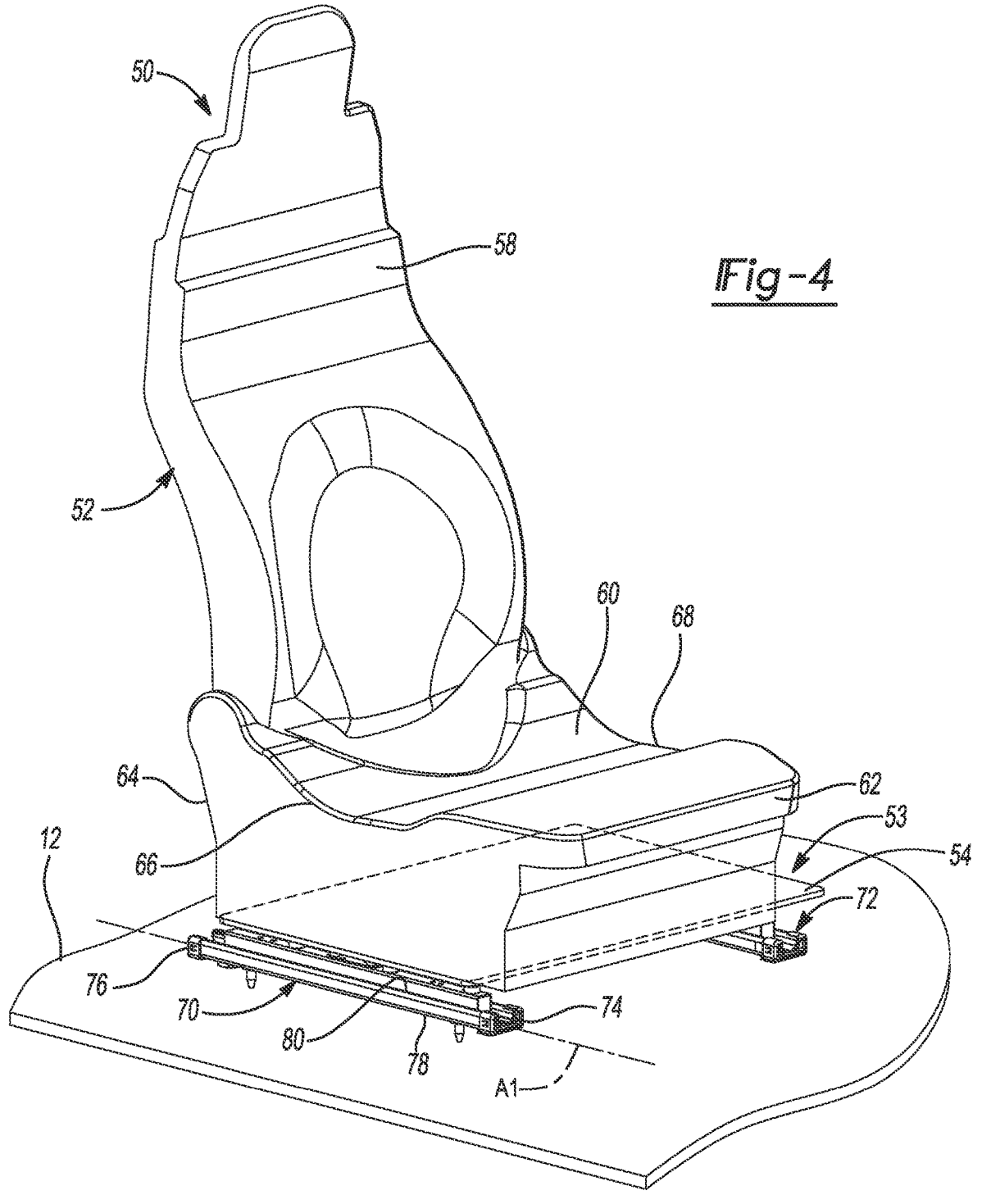
FIG. 4 is a perspective view of the seat assembly of FIG. 1 in the first fore-aft position and the first angular position.
Figure 5:
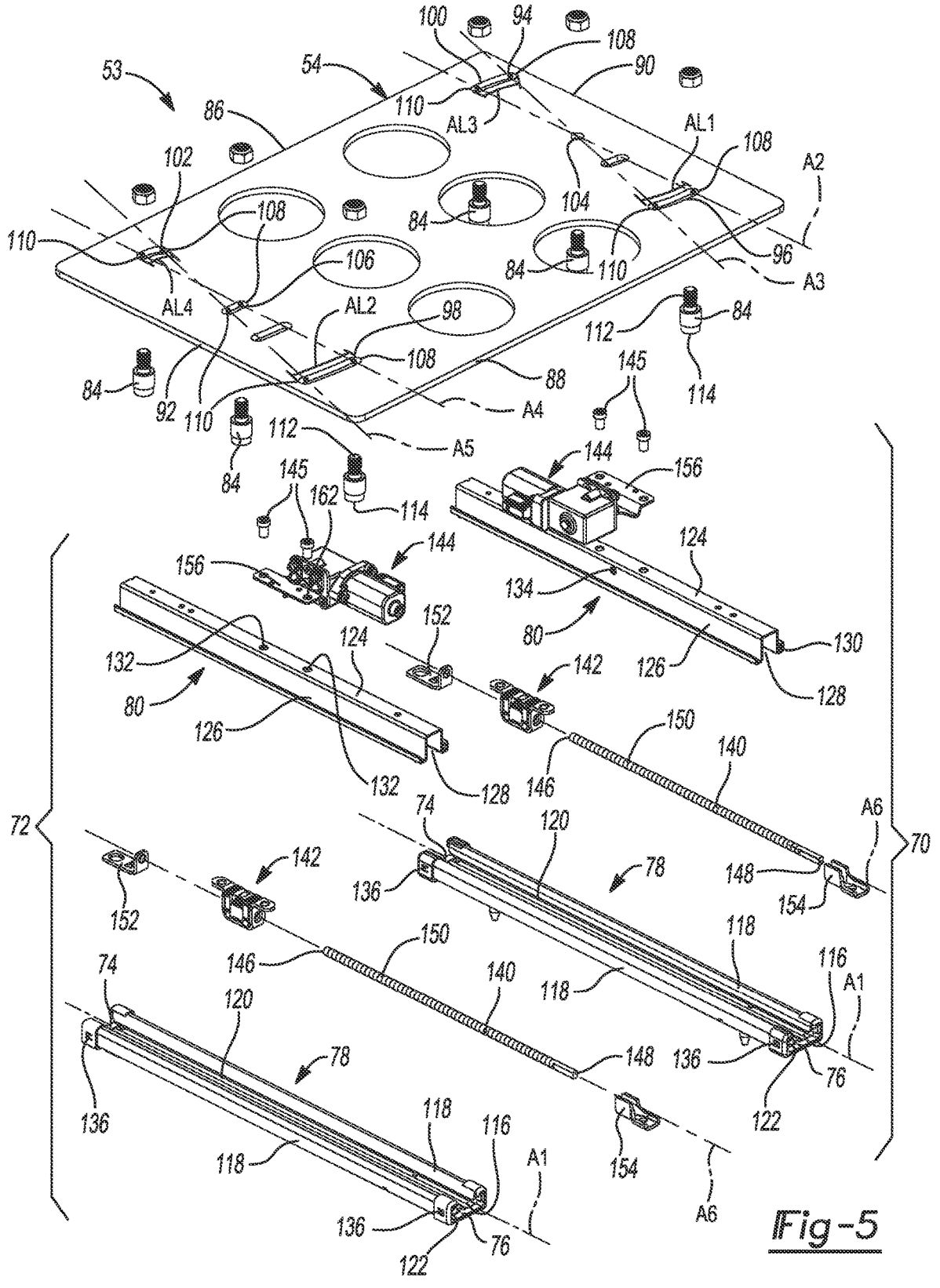
FIG. 5 is an exploded view of a seat adjustment assembly of the seat assembly of FIG. 1.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figures 10, 11:
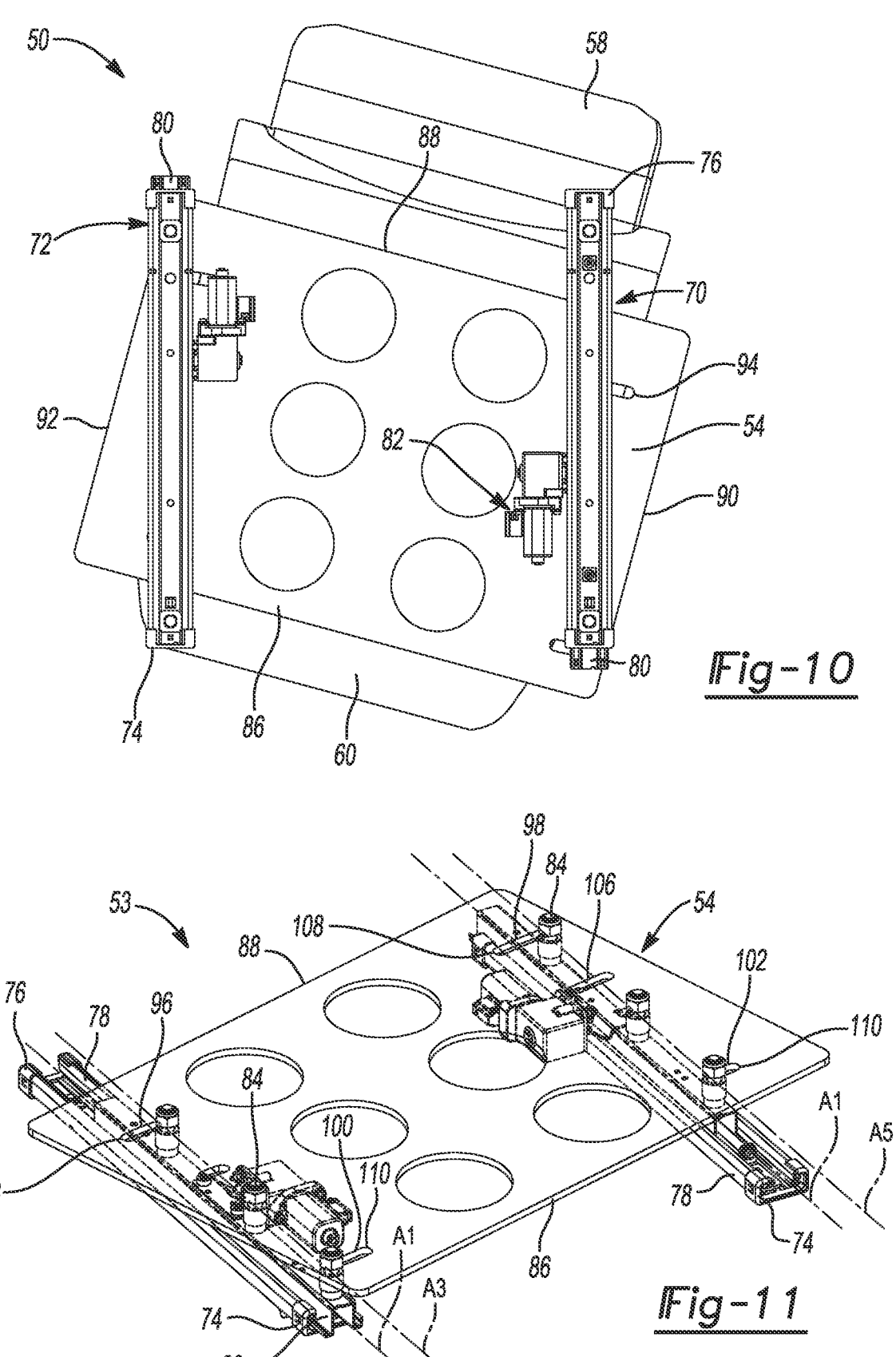
FIG. 10 is a bottom view of the seat assembly of FIG. 4 in the second angular position.
FIG. 11 is a perspective view of the seat adjustment assembly in the second angular position.

With reference to FIGS. 1-16, a seat assembly 50 is provided that may be installed in a vehicle 10. The seat assembly 50 may include a seat 52 and a seat adjustment assembly 53. The seat adjustment assembly 53 may move the seat 52 relative to a floor 12 of the vehicle 10. More specifically, the seat adjustment assembly 53 may move the seat 52 relative to the floor 12 in a fore-aft direction (e.g., linearly forward and backward) between a first fore-aft position (FIGS. 1, 6 and 7) and a second fore-aft position (FIGS. 2, 8 and 9) and in an angular direction (e.g., a rotary direction) between a first angular position (FIGS. 1, 6-9) and a second angular position (FIGS. 3, 10 and 11). The seat adjustment assembly 53 may move the seat 52 in the fore-aft direction and the angular direction independently. In some configurations, the seat adjustment assembly 53 may also be capable of simultaneously moving the seat 52 in the fore-aft direction and in the angular direction. The seat adjustment assembly 53 may move the seat 52 in the fore-aft direction to a plurality of positions between and/or beyond the first and second fore-aft positions. The seat adjustment assembly 53 may also move the seat 52 in the angular direction to a plurality of positions between the first and second angular positions.

The seat 52 includes a seatback 58 and a seat bottom 60. The seat bottom 60 includes a front end 62, a rear end 64, a first lateral side 66, and a second lateral side 68. More specifically, the seat 52 extends longitudinally between the front end 62 and the rear end 64, and the seat 52 extends laterally between the first and second lateral sides 66, 68. The seatback 58 may be movable relative to the seat bottom 60 (e.g., via a recliner assembly; not shown).

The seat adjustment assembly 53 may include a seat base 54, a first seat track assembly 70, and a second seat track assembly 72. The seat bottom 60 may be mounted to the seat base 54, and the seat base 54 may be mounted to the seat track assemblies 70, 72. The seat track assemblies 70, 72 may be mounted to the floor 12 of the vehicle 10.

The first and second track assemblies 70, 72 are positioned parallel to each other and spaced apart from each other. In some embodiments, the first seat track assembly 70 may have the same component structure as the second seat track assembly 72. In other embodiment the first seat track assembly 70 may have different component structures than the second track assembly 72. Each of the first and second seat track assemblies 70, 72 may include a lower track 78, an upper track 80, and a drive assembly 82. The lower tracks 78 may be fixedly attached to the floor 12 of the vehicle 10. Each of the lower tracks 78 includes a front end 74 and a rear end 76.

The seat base 54 may be movably attached to the upper tracks 80 using mechanical fasteners 84 (e.g., protrusions such as bolts, screws, rivets, pins, etc.), or any other suitable fastening technique. Each upper track 80 slidably engages and is supported by a respective one of the lower tracks 78 such that the upper tracks 80 are movable relative to the lower tracks 78 and the floor 12 in the fore-aft direction along axis A1. That is, the upper track 80 is partially received within the lower track 78 and is slidable therein along the length of the lower track 78.

The seat base 54 is positioned vertically between the seat bottom and the seat track assemblies 70, 72. In other words, the seat base 54 is positioned vertically above the seat track assemblies 70, 72 and vertically below the seat bottom 60. The seat base 54 includes a front end 86, a rear end 88, a first lateral side 90, and a second lateral side 92. More specifically, the seat base 54 extends longitudinally between the front end 86 and the rear end 88, and the seat base 54 extends laterally between the first lateral side 90 and the second lateral side 92. The seat bottom 60 may be fixedly attached to the seat base 54 (e.g., by fasteners not shown in the figures) such that the front end 86 of the seat base 54 is positioned near the front end 62 of the seat bottom 60 and the rear end 88 of the seat base 54 is positioned near the rear end 64 of the seat bottom 60.

The seat base 54 may include a plurality of apertures 94 through which the protrusions or mechanical fasteners 84 may extend. That is, each aperture 94 movably receives a respective one of the mechanical fasteners 84 to allow the seat base 54 (and seat 52) to swivel or rotate relative to the seat track assemblies 70, 72 in the angular direction. The apertures 94 may be curved slots (e.g., arc-shaped slots) to accommodate the rotary motion of the seat base 54 and seat 52 relative to the seat track assemblies 70, 72. Arc lengths AL1, AL2, AL3, AL4 of the apertures 94 (spanning between opposing ends of each aperture 94) may be selected to allow for a desired range of rotary motion of the seat base 54 and seat 52 in the angular direction. Some of the apertures 94 may have different arc lengths than others of the apertures 94.

In the example shown in FIGS. 5-11, the apertures 94 in the seat base 54 may include a first rear aperture 96, a second rear aperture 98, a first front aperture 100, a second front aperture 102, a first medial aperture 104, and a second medial aperture 106. Each of the apertures 96, 98, 100, 102, 104, 106 may include a first end 108 and a second end 110. The first rear aperture 96, first medial aperture 104, and first front aperture 100 may be positioned near the first lateral side 90 of the seat base 54. The first rear aperture 96, first medial aperture 104, and first front aperture 100 may be longitudinally arranged such that the first medial aperture 104 is positioned longitudinally between the first rear aperture 96 and the first front aperture 100. The first rear aperture 96 is positioned near the rear end 88 of the seat base 54 and the first front aperture 100 is positioned near the front end 86 of the seat base 54.

Additionally, the second front aperture 102, second medial aperture 106, and second rear aperture 98 may be positioned near the second lateral side 92 of the seat base 54. The second rear aperture 98, second medial aperture 106, and second front aperture 102 may be longitudinally arranged such that the second medial aperture 106 is positioned longitudinally between the second rear aperture 98 and the second front aperture 102. The second rear aperture 98 is positioned near the rear end 88 of the seat base 54 and the second front aperture 102 is positioned near the front end 86 of the seat base 54.

As described above, one or more of the apertures 96, 98, 100, 102, 104, 106 of the seat base 54 may be formed in an arc shape. In the embodiment shown in FIGS. 5-14, the first rear aperture 96 has an arc length of AL1, the second rear aperture 98 has an arc length of AL2, the first front aperture 100 has an arc length of AL3, and the second front aperture 102 has an arc length of AL4. The arc shape may extend in a generally lateral direction between the first and second lateral sides 90, 92 of the seat base 54. In some configurations, one or more of the apertures 94 (such as the aperture 104, for example) could be generally round or oblong, rather than arc shaped.

The first end 108 of the first rear aperture 96, the first medial aperture 104, and the second end 110 of the first front aperture 100 may be aligned to an axis A2. The second end 110 of the first rear aperture 96, the first medial aperture 104 and the first end 108 of the first front aperture 100 may be aligned to an axis A3. The axis A2 and axis A3 may intersect at the first medial aperture 104. Additionally, the first end 108 of the second rear aperture 98, the first end 108 of the second medial aperture 106, and the second end 110 of the second front aperture 102 may be aligned an axis A4. The second end 110 of the second rear aperture 98, the second end 110 of the second medial aperture 106, and the first end 108 of the second front aperture 102 may be aligned to an axis A5.

As described above, the seat base 54 may be linked to the upper tracks 80 of the seat track assemblies 70, 72 using the mechanical fasteners 84 extending through one or more of the apertures 94 of the seat base 54. In the embodiment shown in FIGS. 5-11, each of the apertures 96, 98, 100, 102, 104, 106 receives a respective one of the mechanical fasteners 84. Each mechanical fastener 84 includes a first fastener end 112 and a second fastener end 114. The second fastener end 114 is fixedly attached to the pair of upper tracks 80 and the first fastener end 112 is slidably coupled to the respective aperture 94 of the seat base 54 such that the mechanical fasteners 84 may be positioned substantially perpendicular to the axis A1. More specifically, the mechanical fasteners 84 coupled to the apertures 96, 104, 100 are linked to the upper track 80 of the first seat track assembly 70 and the mechanical fasteners 84 coupled to the apertures 98, 106, 102 are linked to the upper track 80 of the second seat track assembly 72.

In the example shown in FIGS. 1-11, when the seat assembly 50 is in the first angular position (shown in FIGS. 6-9), the mechanical fasteners 84 may be positioned at the first end 108 of the first rear aperture 96, at the second end 110 of the first front aperture 100, at the first end 108 of the second rear aperture 98, at the first end 108 of the second medial aperture 106, and at the second end 110 of the second front aperture 102.

Figures 8, 9:
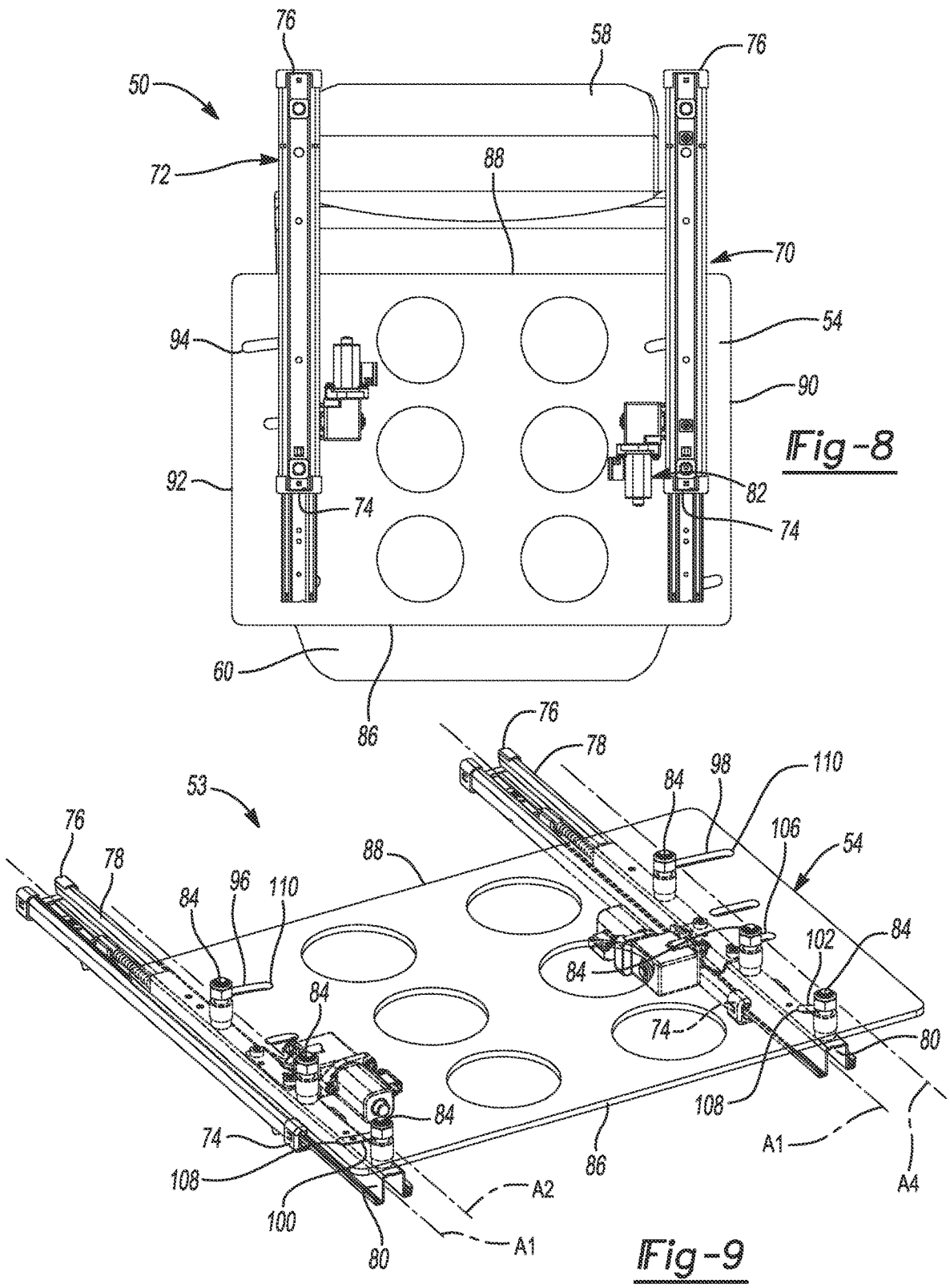
FIG. 8 is a bottom view of the seat assembly of FIG. 4 in the second fore-aft position and the first angular position.
FIG. 9 is a perspective view of the seat adjustment assembly in the second fore-aft position and the first angular position.

As described above, the seat adjustment assembly 53 may adjust the seat 52 among a plurality of positions in the fore-aft direction including the first fore-aft position (FIGS. 6-7) and the second fore-aft position (FIGS. 8-9). It will be appreciated that the seat adjustment assembly 53 may move the seat 52 to a plurality of positions between the first and second fore-aft positions and the seat adjustment assembly 53 may move the seat 52 further rearward than the first fore-aft position. As will be described in greater detail below, movement of the seat 52 in only the fore-aft direction results when the upper track 80 of the first seat track assembly 70 and the second seat track assembly 72 move in substantially the same direction along the axis A1 and at substantially the same linear speed. A first direction is defined as a direction toward the front end 74 along the axis A1. A second direction is defined as a direction toward the rear end 76 along the axis A1. In the embodiment shown in FIGS. 6-9, the upper tracks 80 of the first and second seat track assemblies 70, 72 may be moved in the first direction to move the seat bottom 60 from the first fore-aft position (FIGS. 6 and 7) to the second fore-aft position (FIGS. 8 and 9). The upper tracks 80 of the first and second seat track assemblies 70, 72 may be moved in the second direction to move the seat 52 from the second fore-aft position (FIGS. 8 and 9) to the first fore-aft position (FIGS. 6 and 7). It will be appreciated that the upper tracks 80 of the first and second seat track assemblies 70, 72 may be moved further in the second direction toward the rear end 76 to move the seat 52 in a further rearward position (not shown).

Specifically, the drive assemblies 82 of each of the first and second seat track assemblies 70, 72 cause movement of the upper tracks 80, while the lower tracks 78 are fixed to the floor 12 of the vehicle 10. Because the upper tracks 80 are coupled to the seat base 54 using mechanical fasteners 84, movement of the upper tracks 80 of the first and second seat track assemblies 72 cause corresponding movement of the seat base 54 and seat 52.

The upper tracks 80 of the first and second seat track assemblies 72 may also be moved to a range of positions in the angular direction including the first angular position (FIGS. 6-7) and the second angular position (FIG. 10-11). Movement of the seat bottom 60 in the angular direction results when either: the upper tracks 80 of the first and second seat track assemblies 70, 72 are moved in opposite directions along the axis A1, when the upper track 80 of one of the seat track assemblies 70, 72 is moved at a different linear velocity (i.e., at different speed and/or different direction) than the upper track 80 of the other one of the seat track assemblies 70, 72, or when only one of the upper tracks 80 is moved and the other upper track 80 remains stationary (i.e., when the linear velocity of one of the upper tracks 80 is zero and the linear velocity of the other upper track 80 is non-zero). For example, the upper track 80 of the first seat track assembly 70 may be moved in the first direction and the upper track 80 of the second seat track assembly 72 may be moved in the second direction to move the seat 52 from the first angular position toward the second angular position. As another example, the upper track 80 of the first seat track assembly 70 may be moved in the second direction and the upper track 80 of the second seat track assembly 72 may be moved in the first direction to move the seat 52 from the second angular position toward the first angular position. In some configurations, the upper track 80 of the second seat track assembly 72 may be moved at a faster linear velocity than the upper track 80 of the first seat track assembly 70 when moving the seat 52 between the first and second angular positions. For example, the upper track 80 of the first seat track assembly 70 may move at a linear velocity of 20 mm/s and the upper track of the second seat track assembly 72 may move at a linear velocity of 70 mm/s when moving the seat 52 between the first and second angular positions. In some configurations and in a non-limiting example, the absolute value of the linear velocity of the upper track 80 of the second seat track assembly 72 in relation to the linear velocity of the upper track 80 of the first seat track assembly 70 may be up to 3.7:1.

When the upper tracks 80 of the first and second seat track assemblies 70, 72 are either moving in opposite directions along the axis A1 or the upper tracks 80 are moving along the lower tracks 78 at different linear velocities, the mechanical fasteners 84 coupled to the seat base 54 may translate within the respective aperture of the seat base 54 to cause corresponding rotation (angular movement) of the seat base 54 among a range of positions relative to the upper track 80 including the first angular position (FIGS. 6-7) and the second angular position (FIGS. 10-11). For example, the mechanical fasteners 84 can slide between the first ends 108 of the apertures 96, 98, 100, 102, 106 and the second ends 110 of the apertures 96, 98, 100, 102, 106 when the seat base 54 moves from the first angular position to the second angular position.

Referring now to FIGS. 5 and 12-16, each lower track 78 may include a lower wall 116 and a pair of sidewalls 118 supported by, and extending transversely from, the lower wall 116. For example, the pair of sidewalls 118 may be integrally formed with the lower wall 116 and may and extend from opposite sides of the lower wall 116. In this manner, the lower wall 116 and the sidewalls 118 cooperate to form a U-shaped cross-sectional shape and define a channel 120 extending in a direction substantially parallel to the axis A1.

The upper track 80 may include an upper wall 124 and a pair of sidewalls 126 supported by and extending transversely from the upper wall 124. For example, the pair of sidewalls 126 may be integrally formed with the upper wall 124 and extend from opposite sides of the upper wall 124. In this manner, the upper wall 124 and sidewalls 126 cooperate to form a U-shaped cross-sectional shape and define a channel 128 extending in the direction substantially parallel to the axis A1. The upper wall 124 may include bracket apertures 132 (shown in FIG. 5) (e.g., circular holes or elongated slots) that extend through the upper wall 124 so that the bracket apertures 132 are in communication with the channel 128. One of the sidewalls 126 may include a shaft aperture 134 (shown in FIG. 5) (e.g., a circular hole or elongated slot) that extends through the sidewall 126 so that the shaft aperture 134 is in communication with the channel 128.

As described above, the upper track 80 is coupled to the seat base 54 and translates relative to the lower track 78 to permit selective movement of the seat base 54 relative to the floor 12. For example, a portion of each sidewall 126 of the upper track 80 may be slidably disposed within the channel 120 of the lower track 78 and a portion of each sidewall 118 of the lower track 78 may be slidably disposed within the channel 128 of the upper track 80. Movement of the upper track 80 relative to the lower track 78 may be facilitated by bearings 138 (shown in FIG. 15).

Figure 12:
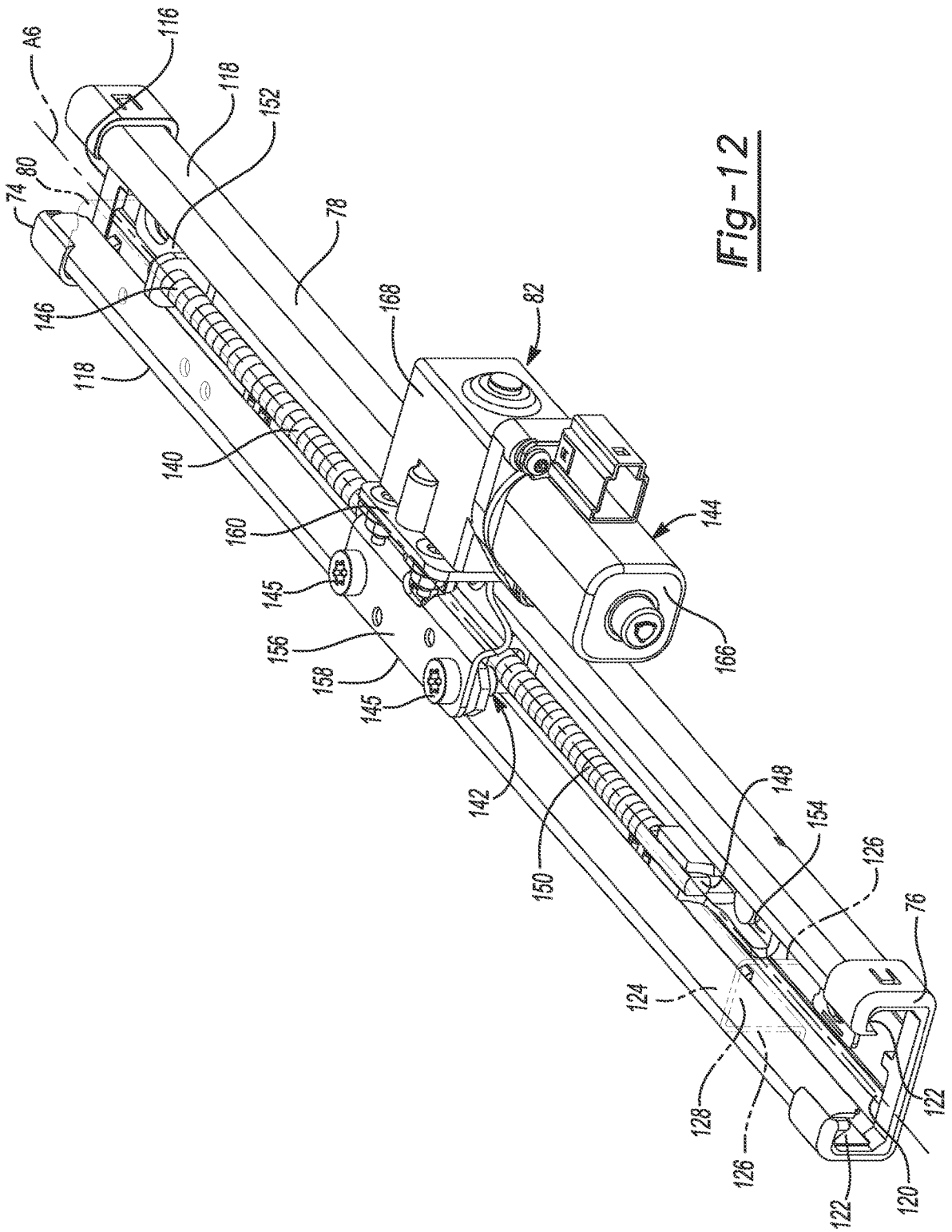
FIG. 12 is a perspective view of one of the seat track assemblies with an upper track of the seat track assembly shown in phantom lines.

As described above, each drive assembly 82 is operable to move a respective one of the upper tracks 80 relative to the respective lower track 78 in the first and second directions along the axis A1. The drive assembly 82 may be any suitable motor and gear assembly (or other transmission assembly). In some embodiments, the drive assembly includes a 90-degree power transmission drive connected with a power length adjuster transmission. In some configurations, the drive assembly 82 may include a spindle screw 140, a length adjuster assembly 142 (e.g., including worm and worm gear), and a driver assembly 144 (e.g., including a motor and gears). With reference to FIG. 12, a portion of the drive assembly 82 may be secured relative to the floor 12 (shown in FIGS. 1-4) and another portion of the drive assembly 82 may be secured relative to the upper track 80. For example, the spindle screw 140 may be rotatably mounted to the lower track 78 and/or to the floor 12 (shown in FIGS. 1-4). The length adjuster assembly 142 may be secured to the upper track 80 using one or more mechanical fasteners 145 (e.g., bolts, screws, rivets, etc.) extending through the bracket apertures 132 in the upper track 80, or any other suitable fastening technique.

The spindle screw 140 may include a front end 146 and a rear end 148. In some implementations, the spindle screw 140 may define a substantially cylindrical rod defining an axis A6 extending from the front end 146 to the rear end 148 and having an outer thread 150 extending along and about the axis A6 from the front end 146 to the rear end 148. In an assembled configuration, the spindle screw 140 may be disposed within the channel 120 of the lower track 78 and/or the channel 128 of the upper track 80 such that the axis A6 is substantially parallel to the axis A1. The front end 146 and the rear end 148 may be mounted to the lower track 78 and/or to the floor 12 (shown in FIGS. 1-4) through studs rigidly mounted on the lower track 78. For example, the front and rear ends 146 may be supported by spindle brackets 152, 154, respectively, that are fixedly mounted to the lower track 78 and/or to the vehicle floor pan.

As shown in FIGS. 12-14, the driver assembly 144 is fixedly attached to the upper track 80. In some embodiments, the driver assembly 144 may be attached to the upper track 80 using a connecting bracket 156. The connecting bracket 156 may be secured to the upper track 80 at a first bracket end 158 and secured to the driver assembly 144 at a second bracket end 160. A first pair of apertures 162 (shown in FIG. 5) are positioned at the first bracket end 158 and a second pair of apertures (not shown) are positioned at the second bracket end 160. Mechanical fasteners 145 may extend through the first pair of apertures 162 (shown in FIG. 5) of the connecting bracket 156 and the upper track 80 to secure the connecting bracket 156 to the upper track 80. The driver assembly 144 may also be attached to the connecting bracket 156 via mechanical fasteners 164 extending through the second bracket end 160.

The driver assembly 144 may include an electric bi-directional motor 166, a housing 168, a first drive shaft 170, a second drive shaft 172, a first helical gear 174 and a second helical gear 176. The electric motor 166 may be operable at a plurality of speeds. In some configurations, the electric motor 166 of the first seat track assembly 70 may operate at a slower rotational speed than the electric motor 166 of the second seat track assembly 72 when the seat adjustment assembly 53 is moving the seat 52 in the angular direction. For example, the electric motor 166 of the first seat track assembly 70 may operate at a rotational speed which causes the first seat track assembly 70 to move at a linear speed of about 20 mm/s and the electric motor 166 of the second seat track assembly 72 may operate at a rotational speed which causes the second seat track assembly 72 to move at a linear speed of about 70 mm/s during movement of the seat bottom 60 in an angular direction between the first angular position and the second angular position. In some embodiments, movement of the seat 52 in the angular direction may be achieved using only one electric motor 166 attached to either the first seat track assembly 70 or the second seat track assembly 72. The electric motor 166 of the first seat track assembly 70 may operate at the same rotational speed as the electric motor 166 of the second seat track assembly 72 when the seat adjustment assembly 53 is moving the seat 52 in only the fore-aft direction.

Figure 16:
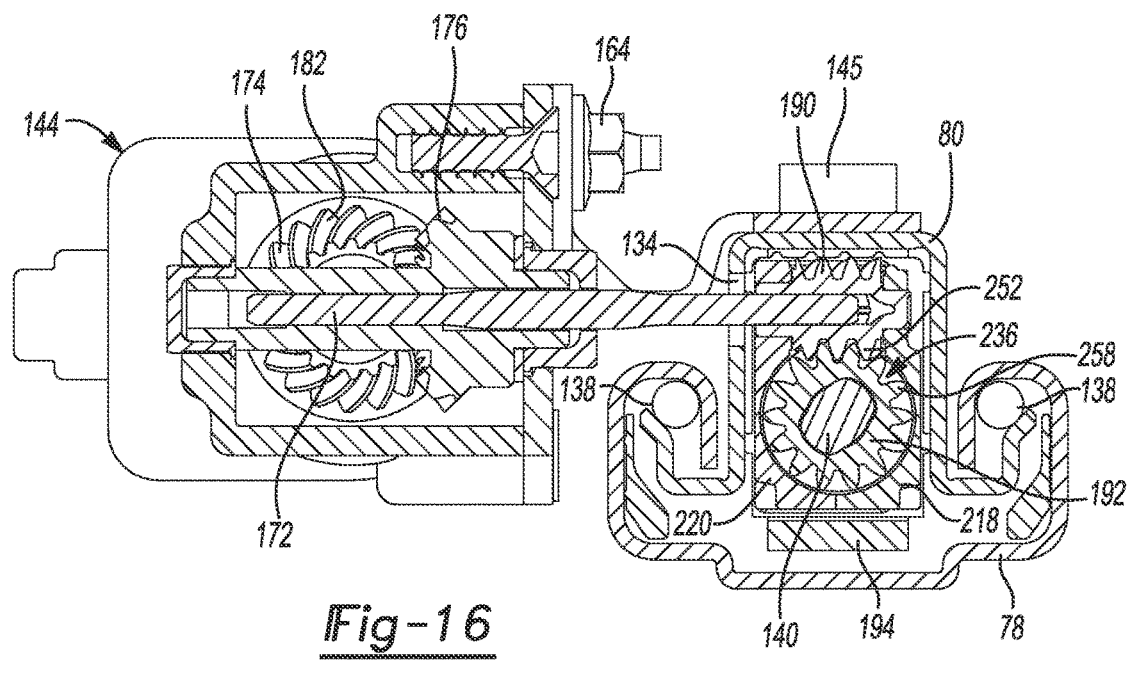
FIG. 16 is a cross-sectional view of the motor gear assembly and the transmission gear assembly.

The housing 168 may be attached to the electric motor 166 and may at least partially encase the first and second helical gears 174, 176 and first and second drive shafts 170, 172. The first drive shaft 170 may be driven by a rotor of the electric motor 166. The first drive shaft 170 may be attached to or integrally formed with the first helical gear 174. The second drive shaft 172 may be attached to or integrally formed with the second helical gear 176. As shown in FIG. 16, the second drive shaft 172 may extend into the length adjuster assembly 142 through shaft aperture 134. The second drive shaft 172 may be positioned substantially perpendicular to the first drive shaft 170.

In the embodiment shown in FIGS. 13-14, each of the first and second helical gears 174, 176 include a plurality of outer gear teeth 182 such that the outer gear teeth 182 of the first helical gear 174 are meshed with the outer gear teeth 182 of the second helical gear 176. The electric motor 166 drives rotation of the first drive shaft 170, thereby rotating the first helical gear 174. Because the outer gear teeth 182 of the first and second helical gears 174, 176 are meshingly engaged with each other, the rotation of the first drive shaft 170 causes simultaneous and corresponding rotation of the second drive shaft 172. Accordingly, the first and second drive shafts 170, 172 transmit rotational movement of the electric motor 166 to the length adjuster assembly 142 to cause the movement of the length adjuster assembly 142 along the spindle screw 140.

Figure 15:
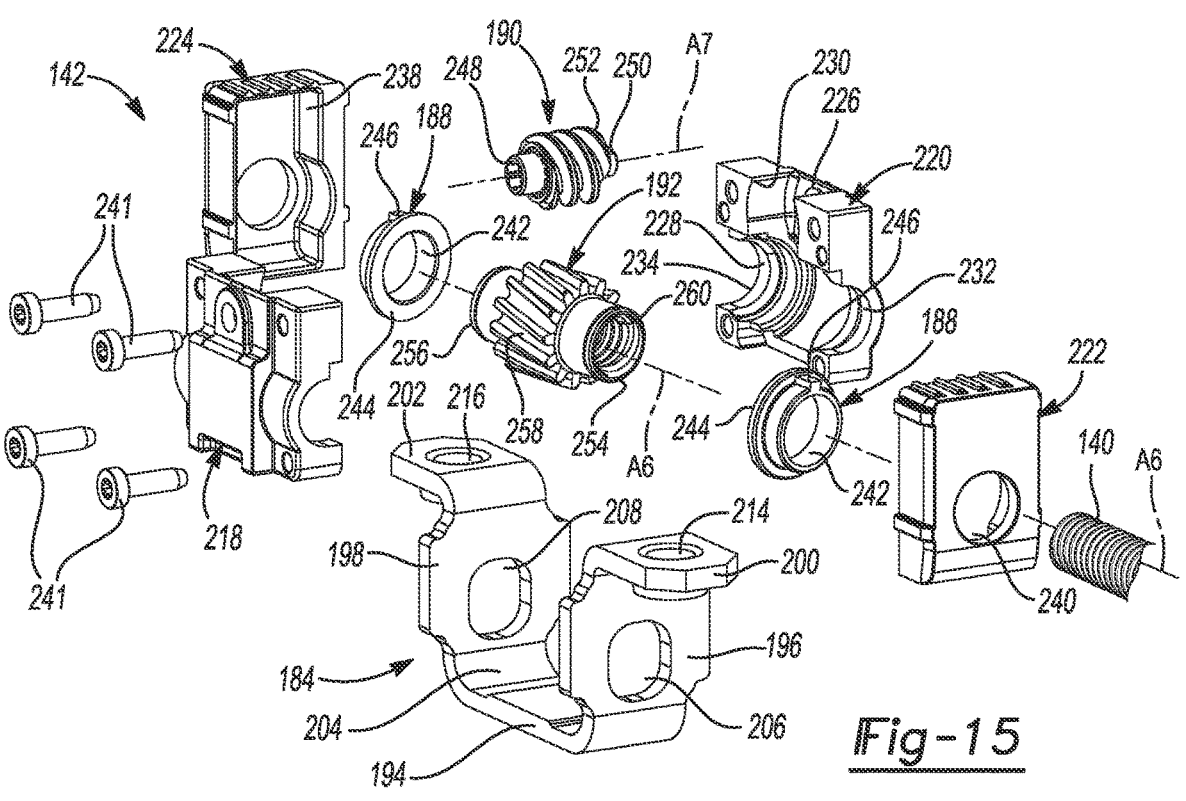
FIG. 15 is an exploded view of a transmission gear assembly of the seat track assembly.

As shown in FIGS. 14-16, the length adjuster assembly 142 may include a support member (or bracket) 184, a housing assembly 186, a pair of bearing bushings 188, a cylindrical worm 190, and a third helical gear 192. Movement of the length adjuster assembly 142 relative to the spindle screw 140 causes the upper track 80 to slide relative to the lower track 78 along axis A1 to move the seat 52 relative to the vehicle floor 12. The performance of the length adjuster assembly 142 may vary to accommodate the specific requirements of the seat 52 and/or vehicle. For example, the length adjuster assembly 142 may vary based on the necessary speed-related and strength-related criteria. The speed-related criteria may include comfort speed, high speed and ultra-high speed. For example, comfort speed may include an average linear adjusting speed ranging from 17 mm/s to 22 mm/s. High speed may include an average linear adjusting speed ranging from 55 mm/s to 60 mm/s. Ultra-high speed may include an average linear adjusting speed ranging from 85 mm/s to 90 mm/s. The strength-related criteria may include normal strength, enhanced strength, high strength, and ultra-high strength. For example, the length adjuster assembly 142 may withstand an axial force of at least 19 kN for normal strength, at least 25 kN for enhanced strength, at least 37 kN for high strength, and at least 45 kN for ultra-high strength.

The support member 184 can be a U-shaped bracket having a base 194, a proximal arm 196, a distal arm 198, a proximal leg 200, and a distal leg 202. The proximal and distal arms 196, 198 may be supported by, and extend transversely from, the base 194. For example, the proximal and distal arms 196, 198 may be integrally formed with, and extend perpendicular from, opposed ends of the base 194, such that the base 194 and the proximal and distal arms 196, 198 cooperate to define a channel 204. The proximal arm 196 may include a proximal aperture 206 and the distal arm 198 may include a distal aperture 208. In the assembled configuration, the proximal and distal apertures 206, 208 may be aligned with the axis A6 such that the spindle screw 140 extends through the proximal and distal apertures 206, 208.

The proximal and distal legs 200, 202 may be supported by, and extend transversely from, the proximal and distal arms 196, 198 respectively. For example, the proximal and distal legs 200, 202 may be integrally formed with and extend perpendicularly from, the proximal and distal arms 196, 198, respectively, such that the proximal and distal legs 200, 202 are substantially parallel to the base 194. The proximal leg 200 may include a proximal retaining feature 210, and the distal leg 202 may include a distal retaining feature 212. In some implementations, the proximal retaining feature 210 may define a proximal aperture 214 and the distal retaining feature 212 may define a distal aperture 216.

The housing assembly 186 may include a lateral housing cover 218, a medial housing cover 220, a proximal cover shell 222 and a distal cover shell 224. The lateral housing cover 218 may engage the medial housing cover 220 to define a gear housing. The proximal cover shell 222 may be substantially similar to the distal cover shell 224 and may engage the housing covers 218, 220.

The housing covers 218, 220 may each include an aperture 226, a longitudinal recess 228, and an upper recess 230. The longitudinal recess 228 may extend from a proximal end 232 to a distal end 234 of the lateral housing cover 218. In the assembled configuration shown in FIG. 16, the lateral housing cover 218 may be mated to the medial housing cover 220 such that (i) the aperture 226 of the lateral housing cover 218 is aligned with the aperture 226 of the medial housing cover 220, (ii) the longitudinal recess 228 of the lateral housing cover 218 is aligned with the longitudinal recess 228 of the medial housing cover 220 to cooperate to define a through-hole 236, and (iii) the upper recess 230 of the lateral housing cover 218 is aligned with the upper recess 230 of the medial housing cover 220 and in communication with the through-hole 236.

The proximal cover shell 222 may include a recess 238 and an aperture 240 in communication with the recess 238. In the assembled configuration, the proximal end 232 of the lateral and medial housing covers 218, 220 may be disposed within the recess 238 of the proximal cover shell 222. Additionally, the distal end 234 of the lateral and medial housing covers 218, 220 may be disposed within the recess 238 of the distal cover shell 224 such that the aperture 240 of the proximal cover shell 222 is aligned with the aperture 240 of the distal cover shell 224. In some implementations, one or more fasteners 241 (e.g., bolts or screws) may engage the lateral and medial housing covers 218, 220, respectively, to further secure the housing assembly 186. The housing assembly 186 may be coupled to the support member 184. For example, the housing assembly 186 may be disposed within the channel 204 of the support member 184. The use of the rubber cover shells, in compression against U-shaped bracket arms, will reduce vibration transmission to the seat 52.

The pair of bearing bushings 188 may include through-holes 242 that receive the third helical gear 192, an annular flange 244 extending about the through-hole 242, as well as protruding features 246 for securing the bearing bushing 188 against rotation while assembled within the housing assembly 186. Each bearing bushing 188 supports the third helical gear 192 for rotation relative to the housing assembly 186.

The cylindrical worm 190 may define an axis of rotation A7 extending from a proximal end 248 to a distal end 250 and may include one or more outer helical threads 252 disposed about the axis of rotation A7 between the proximal and distal ends 248, 250. The cylindrical worm 190 receives the second end 180 of the second drive shaft 172 via the shaft aperture 134. In the assembled configuration, the cylindrical worm 190 may be rotatably supported by the housing assembly 186. For example, the proximal end 248 of the cylindrical worm 190 may be rotatably disposed within the aperture 226 of the lateral housing cover 218, and the distal end 250 of the cylindrical worm 190 may be rotatably disposed within the aperture 226 of the medial housing cover 220, such that at least a portion of the outer helical thread 252 is disposed within, and/or visible through, the through-hole 236 of the housing assembly 186. Accordingly, the axis of rotation A7 of the cylindrical worm 190 may extend in a direction transverse (e.g., perpendicular) to the axis A6 of the spindle screw 140.

The third helical gear 192 may extend from a proximal end 254 to a distal end 256 along the axis A6. The third helical gear 192 includes a plurality of helical gear teeth 258 and inner threads 260. The inner threads 260 and the helical gear teeth 258 may be disposed about the axis of rotation A6. In the assembled configuration, the third helical gear 192 may be disposed within the through-hole 236 of the housing assembly 186 such that the inner thread 260 is threaded to the outer thread 150 of the spindle screw 140, and the helical gear teeth 258 are meshed with the outer helical threads 252 of the cylindrical worm 190. The proximal end 254 of the third helical gear 192 may be disposed within the through-hole 242 of one of the bearing bushings 188, and the distal end 256 of the third helical gear 192 may be disposed within the through-hole 242 of another bearing bushing 188, such that the third helical gear 192 is supported for rotation within the housing assembly 186. The cylindrical worm 190 and the third helical gear 192 may operate at a range of gear ratios (e.g., 3.25:1 or less), including a high and ultra-high gear ratio. For example, the high-speed gear ratio of the cylindrical worm 190 to the third helical gear 192 may be 3.25:1 or less. For example, the ultra-high-speed gear ratio of the cylindrical worm 190 to the third helical gear 192 may be up to 2.6:1.

The operation of the seat adjustment assembly 53 will now be described. The user may operate movement of the seat 52 via a user interface (not shown) that may include switches, buttons, knobs, etc. to control movement of the seat 52 relative to the floor 12. That is, the user interface engages the electric motor 166 of the first and second seat track assemblies 70, 72. The electric motor 166 rotates the first drive shaft 170 at a desired speed and direction. The first drive shaft 170 causes corresponding and simultaneous rotation of the attached first helical gear 174. Because the first helical gear 174 and the second helical gear 176 are meshed together, the first helical gear 174 causes corresponding and simultaneous rotation of the second helical gear 176. As the second drive shaft 172 is received in the second helical gear 176 at the first end 178 and the cylindrical worm 190 at the second end 180, the second drive shaft 172 transfers rotational speed and torque from the driver assembly 144 to the length adjuster assembly 142. More specifically, the second drive shaft 172 causes corresponding and simultaneous rotation of the cylindrical worm 190 and thereby, rotation of the third helical gear 192. Rotation of the third helical gear 192 translates the length adjuster assembly 142 down the spindle screw 140 for movement of the upper track 80, seat base 54, and seat 52.

Figures 22, 23:
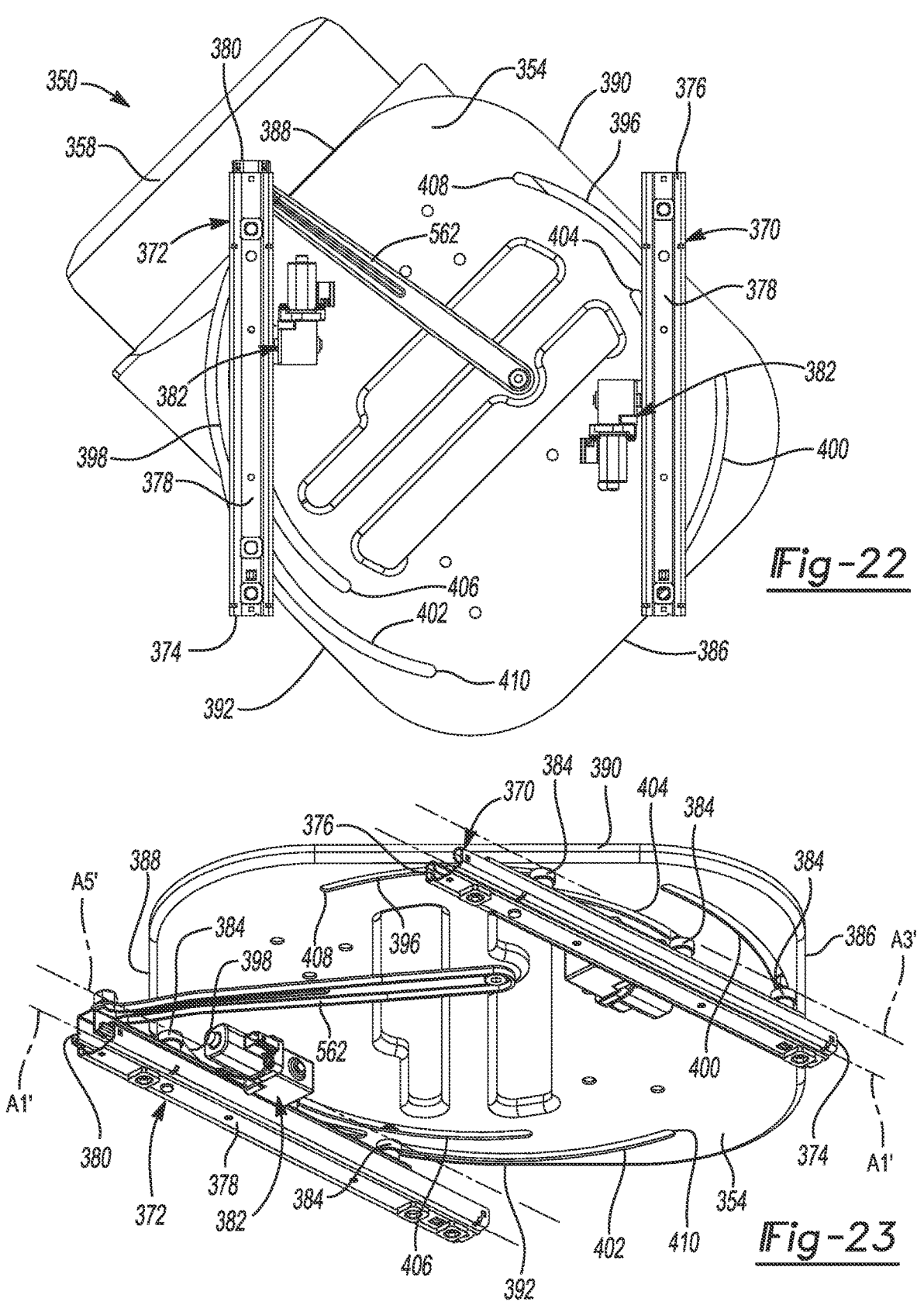
FIG. 22 is a bottom view of the seat assembly of FIG. 17 in a second angular position.
FIG. 23 is a perspective view of the seat adjustment assembly in the second angular position.

With reference to FIGS. 17-23, another seat assembly 350 is provided. The seat assembly 350 may be installed within the vehicle 10 (shown in FIGS. 1-3) in the same or similar manner as the seat assembly 50. Like the seat assembly 50, the seat assembly 350 may include a seat 352 and a seat adjustment assembly 353. The seat 352 may be identical to the seat 52 and has a seatback 358 and a seat bottom 360. The seat adjustment assembly 353 may move the seat 352 relative to the floor 12 (FIGS. 1-3) of the vehicle 10 (FIGS. 1-3). More specifically, the seat adjustment assembly 353 may move the seat 352 relative to the floor 12 in a fore-aft direction (e.g., linearly forward and backward) between a first fore-aft position (FIGS. 18-19) and a second fore-aft position (FIGS. 20-21) and in an angular direction (e.g., a rotary direction) between a first angular position (FIGS. 18-21) and a second angular position (FIGS. 22-23). The seat adjustment assembly 353 may move the seat 352 in the fore-aft direction and the angular direction independently. In some configurations, the seat adjustment assembly 353 may also be capable of simultaneously moving the seat 352 in the fore-aft direction and in the angular direction.

The seat adjustment assembly 353 may include a seat base 354, a first seat track assembly 370, and a second seat track assembly 372. The first and second seat track assemblies 370, 372 are identical to the first and second seat track assemblies 70, 72. Accordingly, the first and second seat track assemblies 370, 372 each include a lower track 378 defining an axis A1', an upper track 380, and a drive assembly 382. Each lower track includes a front end 374 and a rear end 376. The drive assembly 382 may include a spindle screw 440, a length adjuster assembly 442 (e.g., including worm and worm gear), and a driver assembly 444 (e.g., including a motor and gears).

Figure 17:
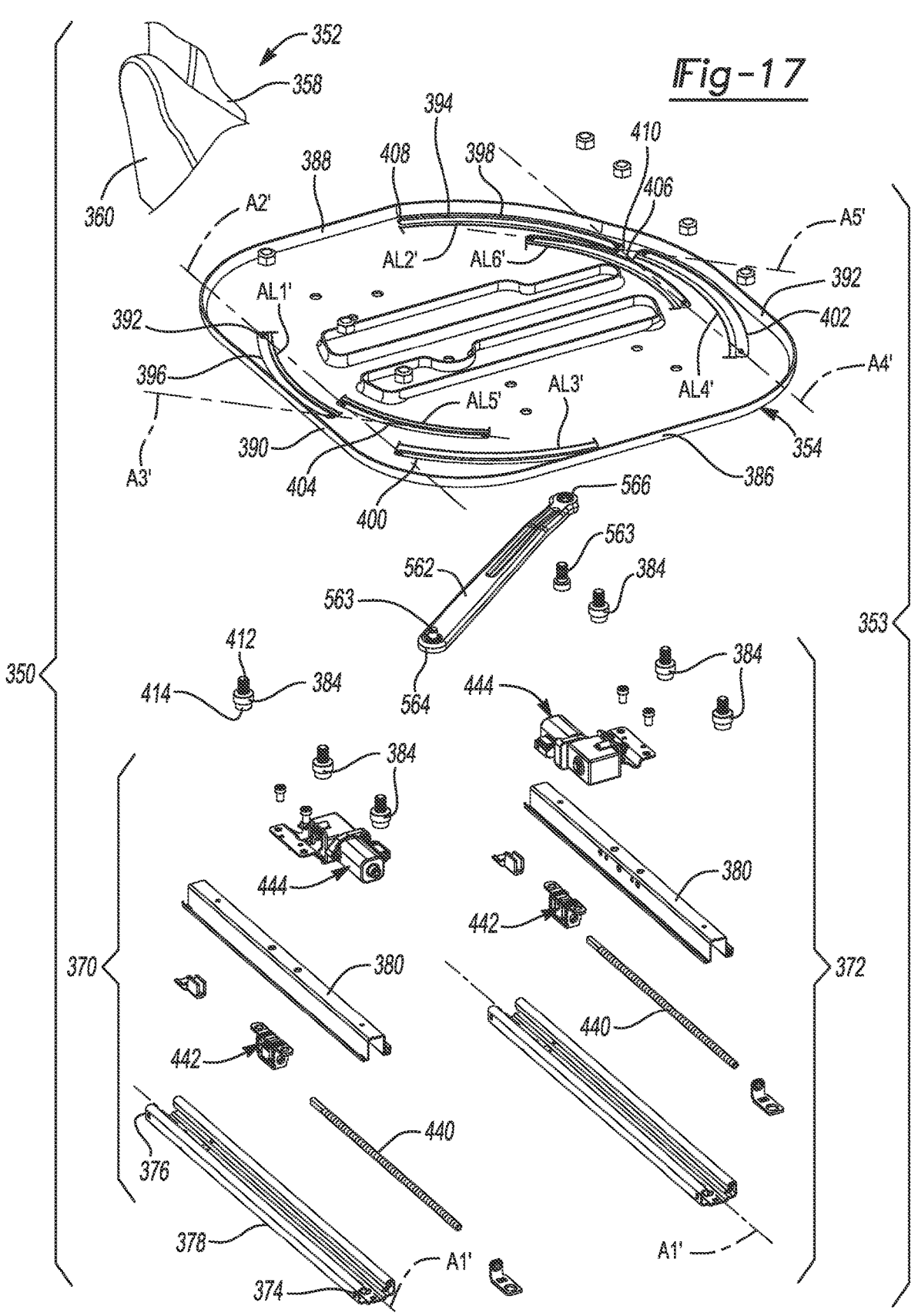
FIG. 17 is an exploded view of another seat assembly according to the principles of the present disclosure.
Figures 18, 19:
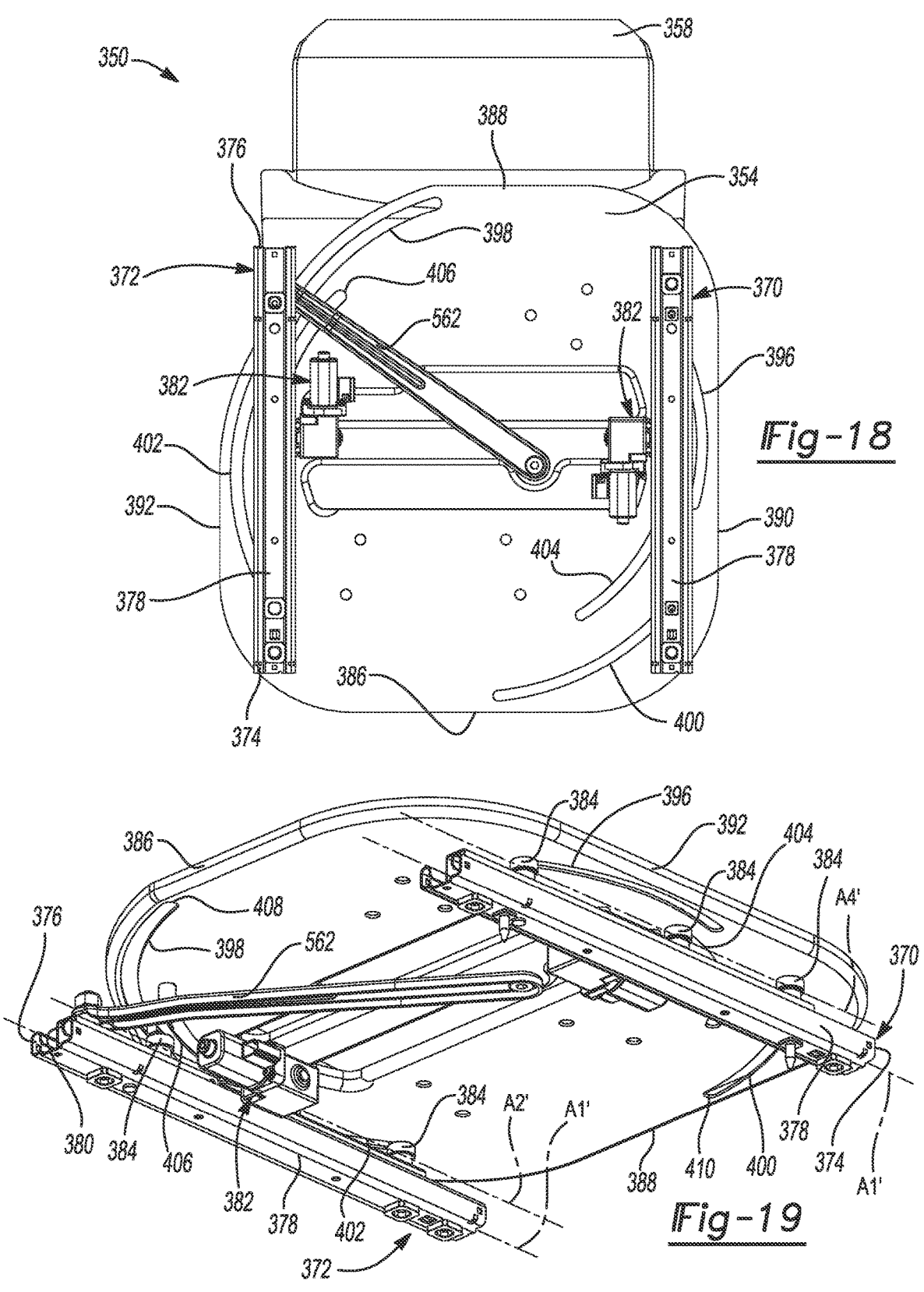
FIG. 18 is a bottom view of the seat assembly of FIG. 17 in a first fore-aft position and a first angular position.
FIG. 19 is a perspective view of a seat adjustment assembly of the seat assembly of FIG. 18 in the first fore-aft position and the first angular position.
Figures 20, 21:
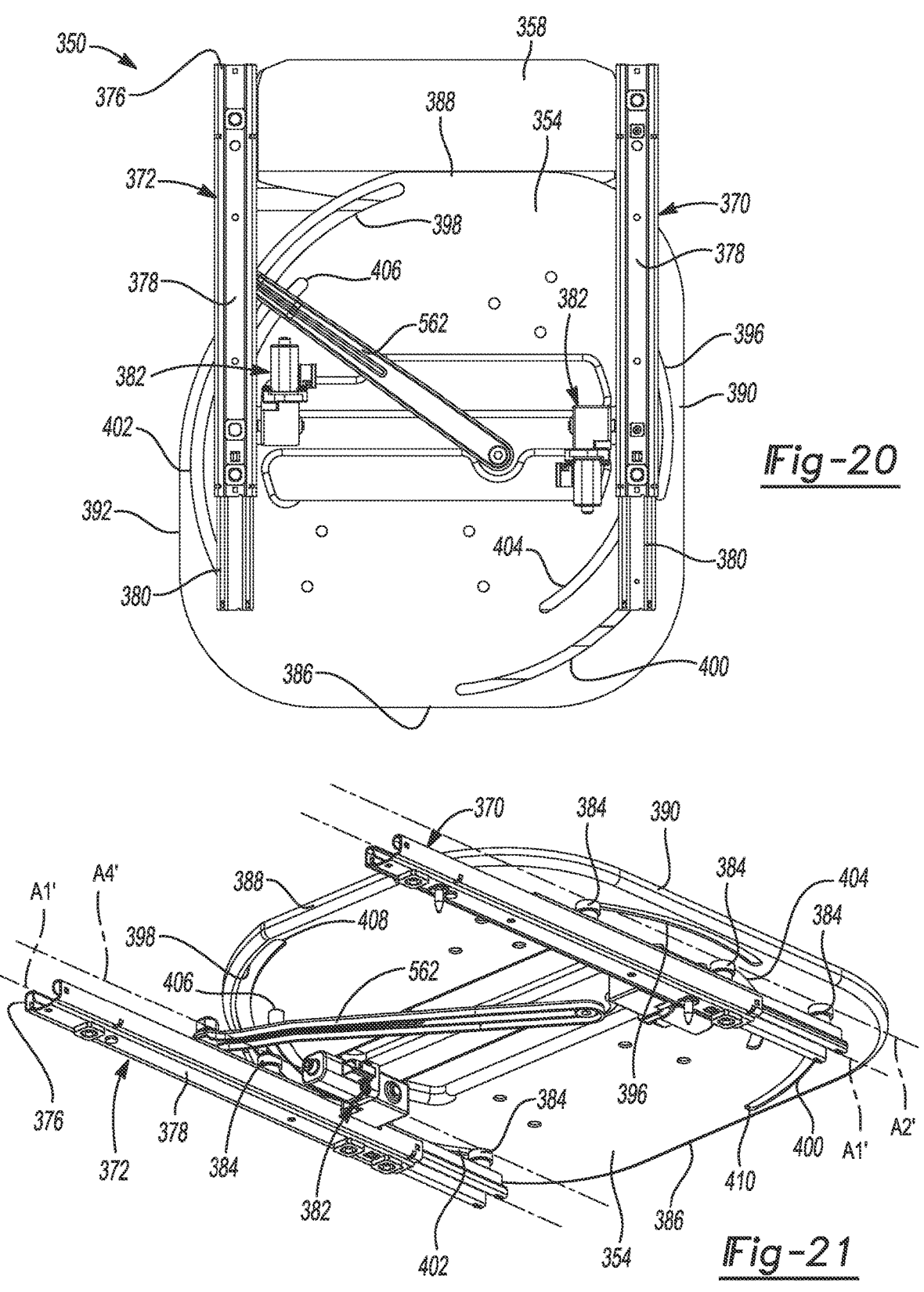
FIG. 20 is a bottom view of the seat assembly of FIG. 17 in a second fore-aft position and the first angular position.
FIG. 21 is a perspective view of the seat adjustment assembly in the second fore-aft position and the first angular position.

With reference to FIGS. 17-19, the seat base 354 may be movably attached to the upper tracks 380 using mechanical fasteners 384 (e.g., protrusions such as bolts, screws, pins, etc.) or any other suitable fastening technique. The seat base 354 is positioned vertically between the seat bottom and the seat track assemblies 370, 372. The seat base 354 includes a front end 386, a rear end 388, a first lateral side 390, and a second lateral side 392. The seat bottom 360 may be fixedly attached to the seat base 354 (e.g., by fasteners not shown in the figures) such that the front end 386 of the seat base 354 is positioned near the front end of the seat bottom 360 and the rear end 388 of the seat base 354 is positioned near the rear end of the seat bottom 360.

The seat base 354 may further include a plurality of apertures 394 through which the protrusions or mechanical fasteners 384 may extend. That is, each aperture 394 movably receives a respective one of the mechanical fasteners 384 to allow the seat base 354 (and seat 352) to swivel or rotate relative to the seat track assemblies 370, 372 in the angular direction. The apertures 394 may be curved slots (e.g., arc-shaped slots) to accommodate rotary motions of the seat base 354 and the seat 352 relative to the seat track assemblies 370, 372. Arc lengths AL1', AL2', AL3', AL4', AL5', AL6' of the apertures 394 may be selected to allow for a desired range of rotary motion of the seat base 354 and the seat 352 in the angular direction. Some of the apertures 394 may have different arc lengths than others of the apertures 394.

In the example shown in FIGS. 17-23, the apertures 394 in the seat base 354 may include a first rear aperture 396, a second rear aperture 398, a first front aperture 400, a second front aperture 402, a first medial aperture 404, and a second medial aperture 406. Each aperture 396, 398, 400, 402, 404, 406 includes a first end 408 and a second end 410. The first rear aperture 396, the first front aperture 400, and the first medial apertures 404 may be positioned near the first lateral side 390 of the seat base 354. More specifically, the first rear aperture 396 may be positioned adjacent to the first lateral side 390 and the first front aperture 400 may be positioned adjacent the front end 386. The first medial aperture 404 may be positioned inboard of the first rear aperture 396 and the first front aperture 400.

Additionally, the second rear aperture 398, the second front aperture 402, and the second medial aperture 406 may be positioned near the second lateral side 392 of the seat base 354. More specifically, the second rear aperture 398 may be positioned adjacent to the rear end 388 and the second front aperture 402 may be positioned adjacent to the second lateral side 392. The second medial aperture 406 may be positioned inboard of the second rear aperture 398 and the second front aperture 402.

As described above, one or more of the apertures 396, 398, 400, 402, 404, 406 of the seat base 354 may be formed in an arc shape. In the embodiment shown in FIGS. 17-23, the first rear aperture 396 has an arc length of AL1', the second rear aperture 398 has an arc length of AL2', the first front aperture 400 has an arc length of AL3', the second front aperture 402 has an arc length of AL4', the first medial aperture 404 has an arc length of AL5', and the second medial aperture 406 has an arc length of AL6'. In some configurations, one or more of the apertures 394 could be generally round or oblong, rather than arc shaped.

The first ends 408 of the first rear aperture 396, the first medial aperture 404, and the first front aperture 400 may be aligned to an axis A2'. The second ends 410 of the first rear aperture 396, the first medial aperture 404 and the first front aperture 400 may be aligned to an axis A3'. Additionally, the second ends 410 of the second rear aperture 398, the second medial aperture 406, and the second front aperture 402 may be aligned an axis A4'. The first ends 408 of the second rear aperture 398, the second medial aperture 406, and the second front aperture 402 may be aligned to an axis A5'.

As described above, the seat base 354 may be linked to the upper tracks 380 of the first and second seat track assemblies 370, 372 using the mechanical fasteners 384 extending through one or more of the apertures 394 of the seat base 354. In the embodiment shown in FIGS. 17-23, each of the apertures 396, 398, 400, 402, 404, 406 receives a respective one of the mechanical fasteners 384. When the seat assembly 350 is in the first angular position (shown in FIGS. 18-19), the mechanical fasteners 384 may be positioned at the first ends 408 of the first rear aperture 396, first front aperture 400, and the first medial aperture 404 and at the second ends 410 of the second rear aperture 398, second front aperture 402, and the second medial aperture 406.

The seat base 354 may also be coupled to the upper track 380 of the second seat track assembly 372 via a support arm 562. The support arm 562 may be attached to the upper track 380 and seat base 354 using mechanical fasteners 563, or any other suitable fastening technique. In the embodiment shown in FIGS. 17-23, the support arm 562 is rotatably attached to the seat base 354 at a first arm end 564 and to the upper track 380 of the second seat track assembly 372 at a second arm end 566.

The operation of seat adjustment assembly 353 is identical to the operation of the seat adjustment assembly 53 and will not be described again.

As demonstrated, the present disclosure provides the seat assembly 50 and seat assembly 350. The drive assembly 82, 382 of the seat track assemblies 70, 72, 370, 372 may operate to move the seat bottom 60, 360 (and seat 52, 352)

to a range of positions in the fore-aft direction between the first fore-aft position and the second fore-aft position as well as move the seat bottom 60, 360 to a range of portions in the angular direction between the first angular position and the second angular position. Use of common components to move the seat bottom 60, 360 in two different directions has the benefit of minimizing complexity, weigh, and cost and fits within a relatively small packaging space The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle seat assembly comprising:

a seatback;

a seat bottom supporting the seatback, wherein the seat bottom and the seatback are movable relative to a vehicle floor among a range of positions including a first angular position and a second angular position;

a pair of seat track assemblies having a first seat track assembly and a second seat track assembly, each of the first and second track assemblies include a lower track and an upper track slidably engaging the lower track, wherein the upper tracks of the first and second seat track assemblies are attached to the seat bottom; and a seat base attached to the seat bottom and movably coupled to the upper tracks, the seat base is movable with the seat bottom and seatback relative to the upper tracks between the first angular position and the second angular position, wherein the upper tracks of the first and second seat track assemblies are independently movable along lengths of the respective lower tracks such that the upper tracks are configured to move along the lengths of the lower tracks at different linear velocities to move the seat base, the seat bottom and the seatback in an angular direction between the first and second angular positions, wherein the vehicle seat assembly further comprises a support arm including a first arm end rotatably coupled to the seat base and a second arm end rotatably coupled to the upper track of the second seat track assembly, and wherein the seat base is rotatable relative to the support arm about an axis that is fixed relative to the seat base and the support arm and extends through the seat base and the first arm end of the support arm.

2. The vehicle seat assembly of claim 1, wherein each of the first and second seat track assemblies includes a motor, and wherein each of the motors drives a respective one of the upper tracks along the length of the respective lower track.

3. The vehicle seat assembly of claim 1, wherein the upper tracks of the first and second seat track assemblies are independently movable together along the lengths of the lower tracks at the same linear velocity to move the seat bottom and the seatback in a fore-aft direction without moving the seat bottom and the seatback in the angular direction.

4. The vehicle seat assembly of claim 1, wherein the seat base includes an elongated aperture having a first aperture end and a second aperture end.

5. The vehicle seat assembly of claim 4, further comprising a protrusion movably received in the elongated aperture of the seat base and engaging the upper track of the first seat track assembly.

6. The vehicle seat assembly of claim 5, wherein the protrusion is a mechanical fastener.

7. The vehicle seat assembly of claim 5, wherein movement of the upper tracks of the first and second seat track assemblies at different linear velocities relative to the lower tracks causes relative movement of the protrusion within the elongated aperture between the first and second aperture ends.

8. The vehicle seat assembly of claim 5, wherein:

the seat base includes a second elongated aperture having a first end and a second end, the vehicle seat assembly further comprises a second protrusion movably received in the second elongated aperture of the seat base and engaging the upper track of the second seat track assembly, and movement of the upper track of the first seat track assembly and movement of the upper track of the second seat track assembly at different linear velocities relative to the lower tracks causes relative movement of the second protrusion within the second elongated aperture between the first and second ends of the second elongated aperture.

9. The vehicle seat assembly of claim 1, further comprising:

a spindle screw attached to the lower track; and a length adjuster assembly attached to the upper track, wherein the length adjuster assembly includes a worm gear threaded about the spindle screw and a cylindrical worm coupled to a drive shaft, the worm gear is meshed with the cylindrical worm.

10. The vehicle seat assembly of claim 9, wherein a gear ratio of the cylindrical worm to the worm gear is less than or equal to 3.25:1.

* * * * *